United States Patent
Creeth

(10) Patent No.: US 7,366,732 B2
(45) Date of Patent: Apr. 29, 2008

(54) FULLY CAPABLE MINIMALLY INFLATABLE OBJECT MODEL SYSTEM FOR MULTIDIMENSIONAL APPLICATIONS

(76) Inventor: Richard F. Creeth, 4 Power Horn Hill Rd., Wilton, CT (US) 06897

( * ) Notice: Subject to any disclaimer, the term of this patent is extended or adjusted under 35 U.S.C. 154(b) by 1186 days.

(21) Appl. No.: 09/785,573

(22) Filed: Feb. 16, 2001

(65) Prior Publication Data
US 2002/0156789 A1    Oct. 24, 2002

(51) Int. Cl.
*G06F 17/30* (2006.01)
(52) U.S. Cl. .......... 707/104.1; 707/101; 707/10; 707/3; 707/2
(58) Field of Classification Search ........ 707/1, 707/2, 3, 102, 103, 100, 101, 10
See application file for complete search history.

(56) References Cited

U.S. PATENT DOCUMENTS

| | | | |
|---|---|---|---|
| 6,330,717 B1 * | 12/2001 | Raverdy et al. ............ 717/170 |
| 6,360,229 B2 * | 3/2002 | Blackman et al. ....... 707/103 R |
| 6,408,292 B1 * | 6/2002 | Bakalash et al. ............... 707/2 |
| 6,418,427 B1 * | 7/2002 | Egilsson et al. ............... 707/2 |
| 6,473,764 B1 * | 10/2002 | Petculescu et al. ......... 707/102 |
| 6,535,872 B1 * | 3/2003 | Castelli et al. ................. 707/3 |
| 6,539,398 B1 * | 3/2003 | Hannan et al. ......... 707/103 R |
| 6,636,242 B2 * | 10/2003 | Bowman-Amuah ......... 345/764 |
| 6,684,207 B1 * | 1/2004 | Greenfield et al. ............. 707/3 |
| 7,010,523 B2 * | 3/2006 | Greenfield et al. ............. 707/3 |
| 7,191,196 B2 * | 3/2007 | Perks et al. ................. 707/203 |
| 2001/0007984 A1 * | 7/2001 | Fattah et al. ................... 707/1 |
| 2001/0054034 A1 * | 12/2001 | Arning et al. ................. 707/1 |
| 2002/0156789 A1 * | 10/2002 | Creeth ........................ 707/100 |

OTHER PUBLICATIONS

OLAP and OLAP Server Definitions, 1997, http://dssresources.com/glossary/olaptrms.html.*
Data Warehousing and OLAP, A Research-Oriented bibliography, http://www.ondelette.com/OLAP/dwbib.html, Aug. 2005.*
Salzman et al., "Parameterizing deformable surfaces for monocular 3-D Tracking", Jul. 2005.*

* cited by examiner

*Primary Examiner*—Jean M. Corrielus
(74) *Attorney, Agent, or Firm*—St. Onge Steward Johnston & Reens LLC

(57) ABSTRACT

A system for displaying data from a multidimensional database to a user is provided. The system includes a system computer and a multidimensional database accessible by the computer, the multidimensional database having objects stored thereon. Object model software executing on the system computer for instantiates and inflates specified objects up-front a first time the database is accessed, and instantiates and inflates objects which are not specified objects on demand as the nonspecified objects are accessed. The object model software employs an object model which includes a dataspace having at least one dataserver. At least one cube object is stored on each dataserver, each cube object having at least one saved view of data. At least one dimension object is also stored on each dataserver, each dimension object having at least one saved subset of elements.

33 Claims, 6 Drawing Sheets

FIG. 4A
(PRIOR ART)

```
<SCRIPT Language=VBSCRIPT>

*GET THE CUBE NAME FROM THE API
*Create Value Pool
ValPoolHandle = TM1ValPoolCreate(SessionHandle)

*Get handle to the Server
ServerNameHandle = TM1ValString(ValPoolHandle, "MyServer", Len("MyHandle"))
ServerHandle = TM1SystemServerHandleGet(SessionHandle, ServerNameHandle)

*Get the handle to the cube object
CubeHandle = TM1ObjectListHandleByIndex(ValPoolHandle, ServerHandle, TM1ServerCubes, 1)

*Get the name property of the cube object
CubeNameHandle = TM1ObjectPropertyGet(ValPoolHandle, CubeHandle, TM1ObjectName)
TM1ValStringGet ValPoolHandle, CubeName, StringLength

*String blanks from string returned from API
CubeName = Left(CubeName, StringLength)

</SCRIPT>
```

FIG. 4B

```
<SCRIPT Language=VBSCRIPT>

*GET THE CUBE NAME FROM OLAPObjects
CubeName = TM1Dataspace.Dataservers(1).Cubes(1).Name

</SCRIPT>
```

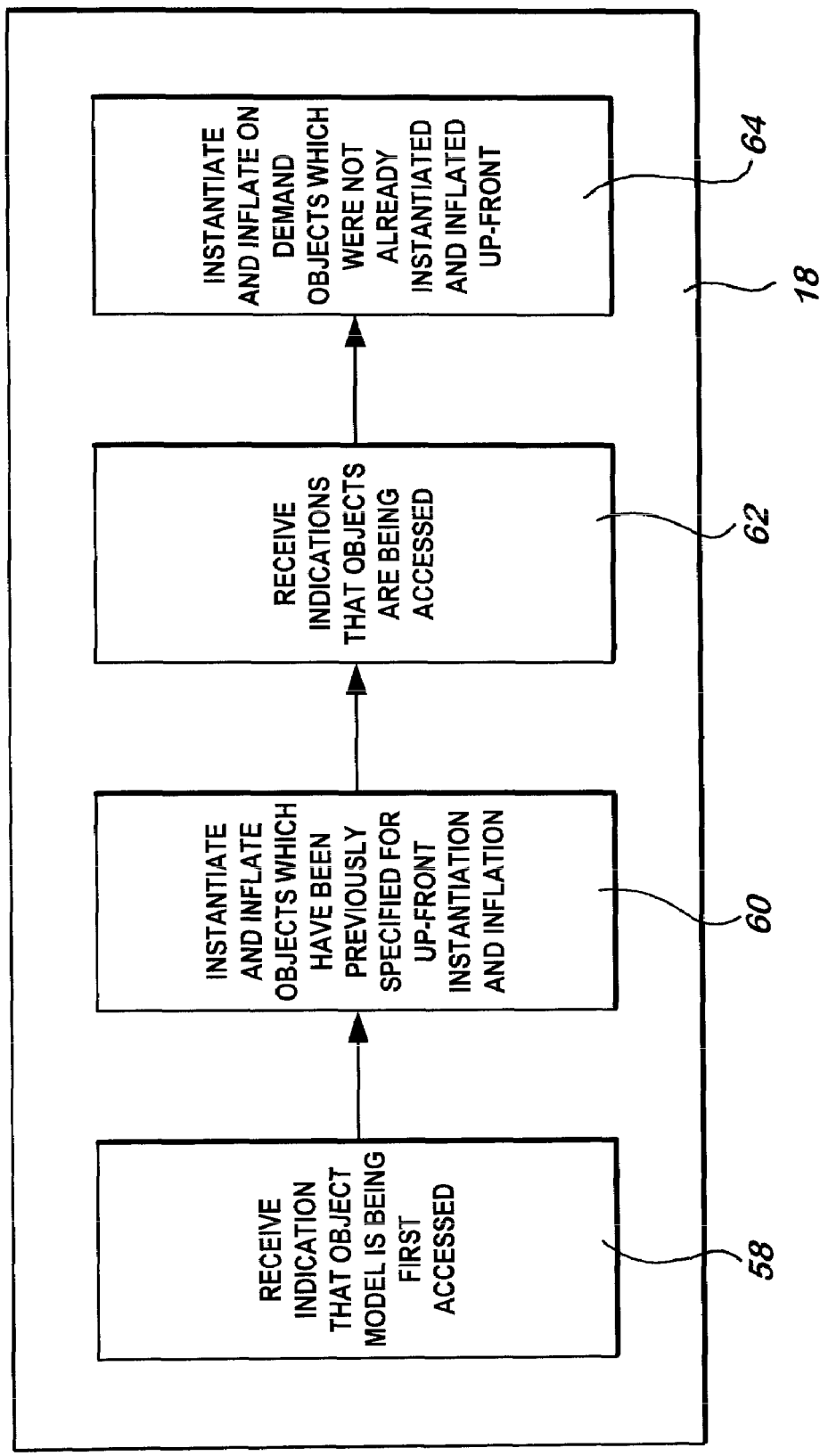

FULLY CAPABLE MINIMALLY INFLATABLE OBJECT MODEL SYSTEM FOR MULTIDIMENSIONAL APPLICATIONS

FIELD OF THE INVENTION

The present invention relates to object model system for multidimensional applications, and more particularly, to such object model system which is minimally inflatable and is expanded in memory only to the extent that a developer or user requests.

BACKGROUND OF THE INVENTION

On Line Analytical Processing (OLAP) is focused on analysis of business data. One of the key points of OLAP is that the data is viewed multidimensionally. This presents a view to the business user that is intuitive and easy to comprehend. It also permits aggregation and more complex derivations to be defined within the multidimensional objects (often referred to as cubes). Business analysts interact with the multidimensional data in the OLAP database using a variety of client tools. Historically, tools such as Excel and multidimensional data browsers have been used for this purpose. In recent years, however, there has been a growing trend to use standard web browsers such as Internet Explorer or Netscape to access web pages containing the reports, analyses and visualizations based on the data in the OLAP database. The advantage of using a web browser is that no additional software need be installed on the client computer. The application can be administered centrally on the server and accessed from anywhere that permits standard internet access.

There are many ways that web servers can build on-demand web pages containing data drawn from a database. Microsoft Corporation has developed one such technology called Active Server Pages (ASP). Active Server Pages are web pages that contain embedded script (e.g., VBScript and JScript to name two of the more popular scripting languages). However, efficient ASP pages should contain a minimal amount of VBScript code. This is because the VBScript must be interpreted, which is slow compared to executing compiled code.

ASP is further capable of accessing additional program libraries in the form of ActiveX controls or dynamic link libraries (DLL's). This means that the functionality of ASP as a dynamic web content generator can be extended through the use of external libraries. For example, ASP can use open database connectivity (ODBC), open linking and embedding database (OLE DB), or other installed drivers to access information from a corporate datamart. Connectivity to these databases is not native to ASP, but comes as a result of ASP's ability to leverage external components and drivers.

All OLAP databases have an Application Programming Interface (API) that allows developers to interact with the database from programming environments such as C++ or Visual Basic. These APIS, however, are not optimized to work with ASP pages. Because ASP pages require large amounts of scripting code to interact directly with an API, the end result is very inefficient production and, consequently, delivery of web pages.

Furthermore, API calls to OLAP databases are typically very low-level, flat function calls. These calls generally do not represent the discrete components or objects in the OLAP Database (i.e., cubes, dimensions, subsets) that the ASP programmer and front-end user are accustomed to using.

One of the challenges of deploying applications via the world wide web is that web technology is stateless. Simply put, this means that each page that is delivered by the server is completely independent of any other pages delivered by the server, even to the same user. If the ASP programmer creates an object to support some features of the page, the life of the object is for the duration of the creation of the page only. Once the server has rendered the page the object is destroyed.

While ASP does provide some native building blocks for maintaining state (e.g. Session variables and Application variables, to name a few), storing large amounts of information about application state in these building blocks (e.g., storing large object variables) can consume large amounts of resources in any moderately sized web application. A web application must not only preserve state, but must preserve state without being a significant burden on server CPU resources.

What is desired, therefore, is an object model system for multidimensional applications which is comprehensive and intuitively structured, which is minimally inflatable and is expanded in memory only to the extent that a developer or user requests, which is capable of preserving application state without wasting large amounts of the web server's resources, and which provides shortcut methods to directly generate web content.

SUMMARY OF THE INVENTION

Accordingly, it is an object of the present invention to provide an object model system for multidimensional applications which is comprehensive and intuitively structured.

Another object of the present invention is to provide an object model system for multidimensional applications having the above characteristics and which is minimally inflatable and is expanded in memory only to the extent that a developer or user requests.

A further object of the present invention is to provide an object model system for multidimensional applications having the above characteristics and which is capable of preserving application state without wasting large amounts of the web server's resources.

Still another object of the present invention is to provide an object model system for multidimensional applications having the above characteristics and which provides shortcut methods to directly generate web content.

These and other objects of the present invention are achieved by provision of a system for displaying data from a multidimensional database to a user. The system includes a system computer and a multidimensional database accessible by the computer, the multidimensional database having objects stored thereon. Object model software executing on the system computer for instantiates and inflates specified objects up-front the first time the database is accessed, and instantiates and inflates objects which are not specified objects on demand as the nonspecified objects are accessed. The object model software employs an object model which includes a dataspace having at least one dataserver. At least one cube object is stored on each dataserver, each cube object having at least one saved view of data. At least one dimension object is also stored on each dataserver, each dimension object having at least one saved subset of elements.

Preferably, a plurality of dataservers are provided. It is also preferable that each dimension object further includes at least one saved element and at least one saved hierarchy, and that the saved view of data includes at least one saved value of data and at least one saved subset of data.

The dataspace preferably comprises an entry point into the object model, and the specified objects are identified via the dataspace. The system preferably further includes software executing on the computer for receiving from the user state information, and an indication of specified objects.

The specified objects may comprise objects, collections of objects, or specific properties of objects. Preferably, the indication of specified objects comprises a structured string variable, which may comprise raw text separated by delimiters, or strings in an extensible markup language (XML) format.

The invention and its particular features and advantages will become more apparent from the following detailed description considered with reference to the accompanying drawings.

BRIEF DESCRIPTION OF THE DRAWINGS

FIGS. 4A and 4B are examples of script required to perform a function comparing the prior art to the object model system of FIG. 1, FIG. 5 is a flowchart illustrating the adaptive instantiation and inflation employed by the object model system of FIG. 1.

DETAILED DESCRIPTION OF THE INVENTION

Figure 1:
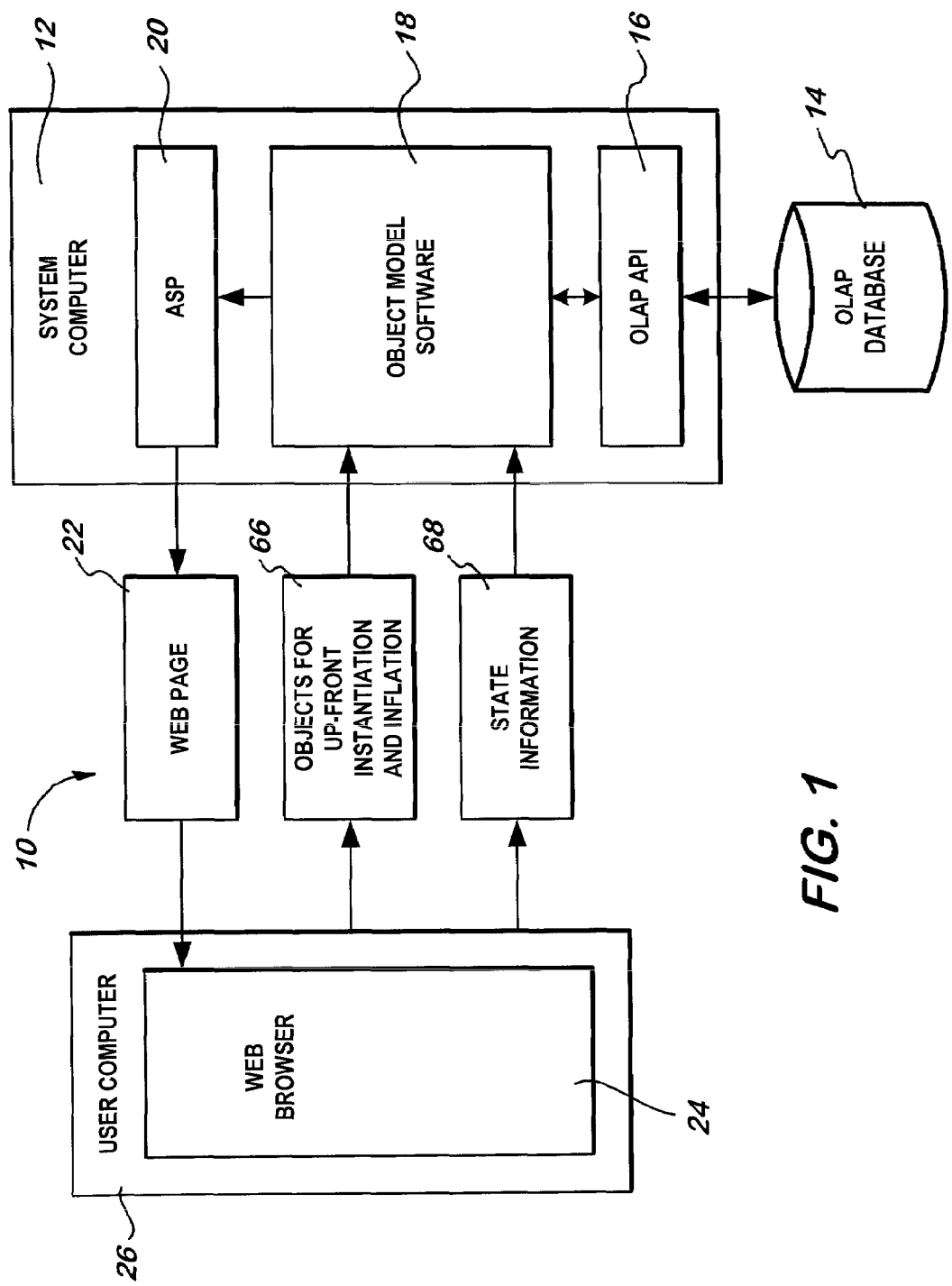
FIG. 1 is a block diagram of an object model system in accordance with the present invention.

FIG. 1 depicts an object model system 10 for multidimensional applications in accordance with the invention. System 10 includes a system computer 12 and an OLAP database 14 accessible by computer 12. Computer 12 may comprise a single computer, or a network of computers, and may comprise one or more web servers, OLAP servers, or other types of servers, it being understood that the computer 12 is not limited to any particular configuration. Computer 12 has OLAP API software 16 executing thereon which communicates with OLAP database 14, in a manner known in the art. Computer 12 also has executing thereon object model software 18 which is in communication with OLAP API software 16 and ASP software 20 executing on computer 12, as described in detail below. ASP software 20 receives information from object model software 18 and used such information to generate and transmit web pages 22, which are viewable by web browser software 24 executing on a user computer 26, as is known in the art. Examples means by which web pages 22 may be transmitted to client computer 26 include, but are not limited to, the Internet, local area network (LAN), wide area network (WAN), a direct modem link, and others.

The object model 28 employed by object model software 18 and the methods and properties that it supports allow the ASP programmer to embed meaningful objects, based on data from the OLAP database 14, in web page 22. The object model 28 exposes the OLAP database's 14 lower-level API in a manner that is much clearer and more concise to the ASP programmer, easing the development process and, more importantly, dramatically reducing the amount of script required in the ASP environment.

Figure 2:
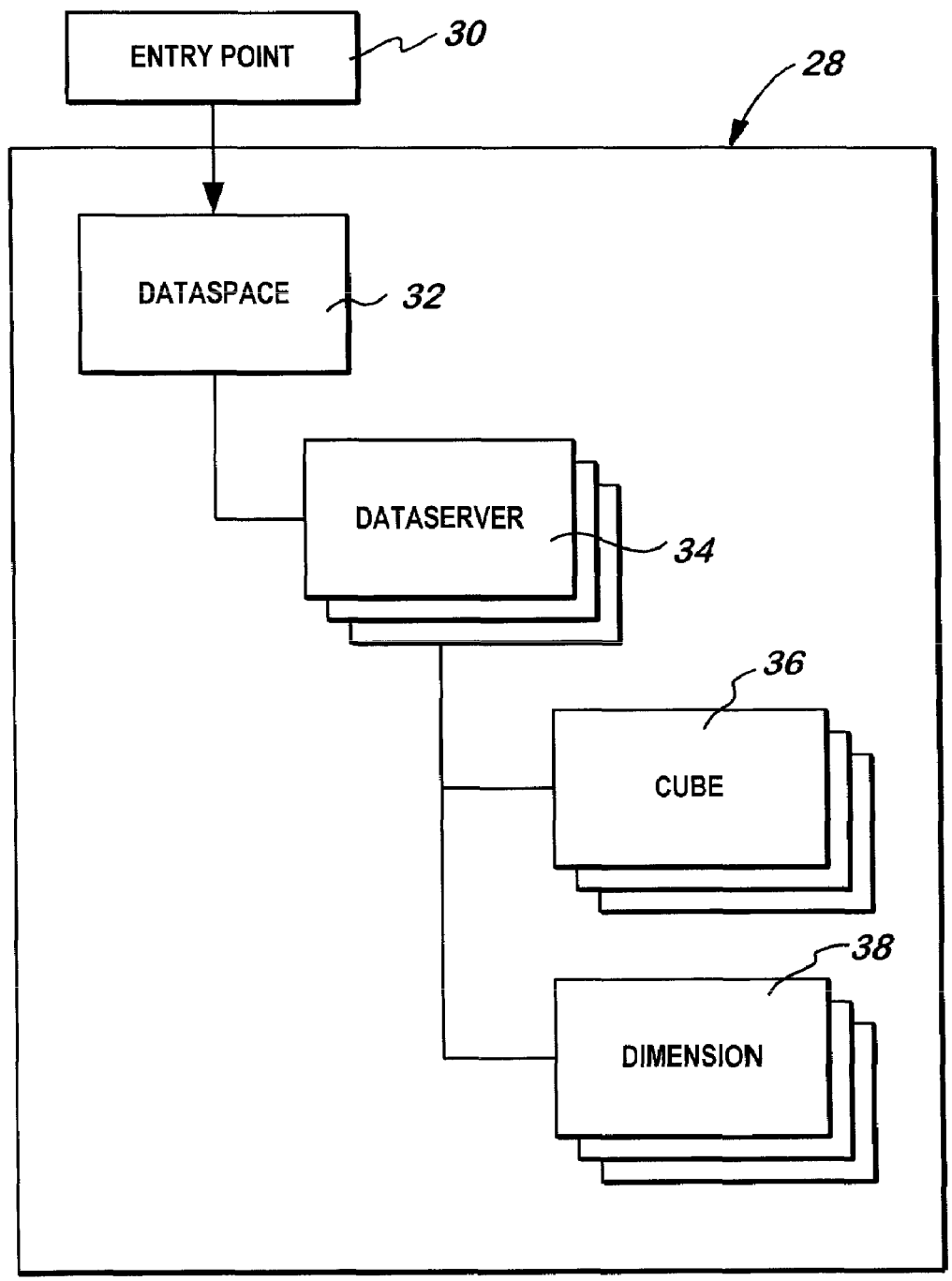
FIG. 2 is a block diagram of a portion of an object model used by the object model system of FIG. 1.

The object model's 28 higher level objects have the interrelated structure shown schematically in FIG. 2. These objects in particular relate to OLAP database's 14 metadata, or data about the data contained on the database 14.

As illustrated in FIG. 2, entering 30 object model 28 at a Dataspace object 32, 10 the programmer has the ability to maintain access with multiple OLAP servers via the Dataserver object 34. Each Dataserver object 34 contains a collection of Cube objects 36 and Dimension objects 38. These standard, high-level metadata objects are found in nearly all OLAP databases. Each object contains a full set of properties and methods relevant to that object. For example, all objects contain a name property, but only a Dataserver object would additionally have a Connect method.

Below the metadata objects are objects that relate to the manipulation of and interaction with the actual data in the OLAP database 14. These objects and their relationships are shown schematically in FIGS. 3A and 3B.

Figure 3B:
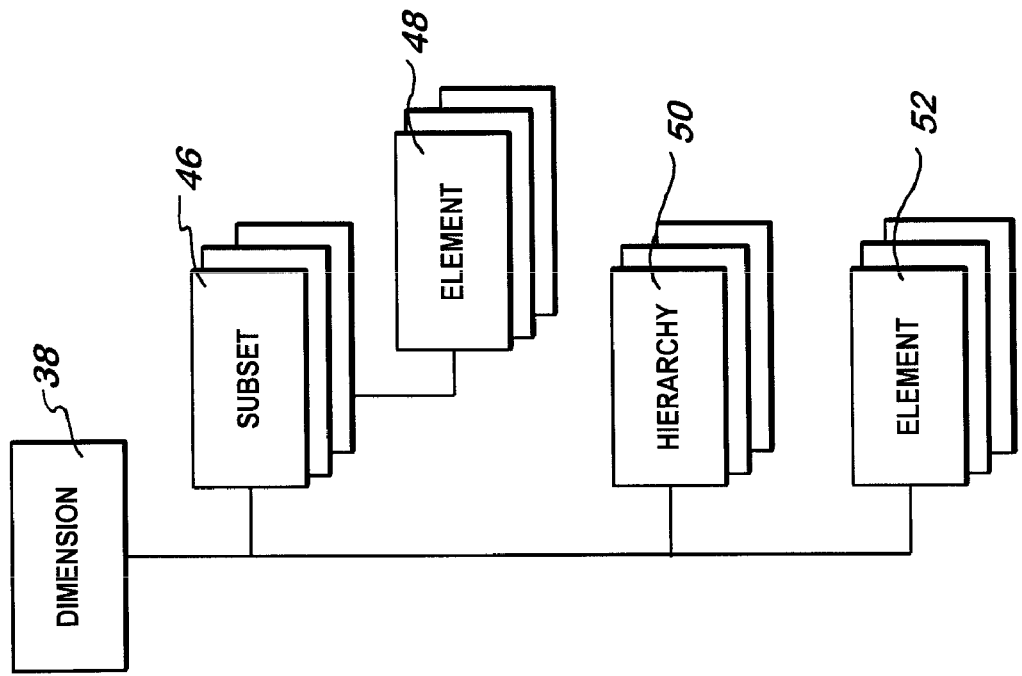
FIGS. 3A and 3B are block diagrams illustrating further details of portion the object model of FIG. 2.
Figure 3A:
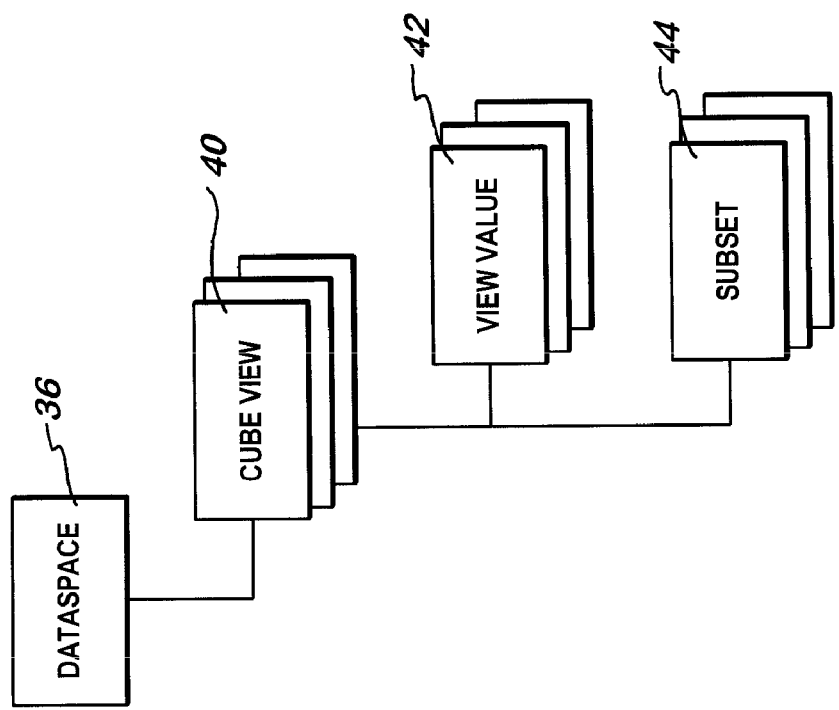

As illustrated in FIG. 3A, each Cube object 36 exposes various other objects that can be used to extract data information from OLAP database 14. This information includes CubeView objects 40 which represent saved views, which themselves may contain ViewValue objects 42 and Subset objects 44. As illustrated in FIG. 3B, each Dimension object 38 also exposes various other objects that can be used to extract data information from OLAP database 14. This information includes Subset objects 46, which represent saved subsets of Element objects 48, Hierarchy objects 50 and Element objects 52. Each of these objects contains a full set of properties and methods relevant to that object.

FIGS. 2, 3A and 3B illustrate just how much more intuitive it is from a programming perspective to look at both metadata and data in terms of objects and their interrelatedness in an object model rather than low-level API function calls.

This type of programming, referred to as object-oriented programming, is fundamental to gaining a full appreciation of the concept behind object model system 10 of the present invention.

To further demonstrate the programming advantage of object model 28, script examples are illustrated in FIGS. 4A and 4B. The examples demonstrate the amount of script 54 an ASP programmer would have to use to return something as simple as a Cube's name using a flat, function-based API (FIG. 4A) versus the amount of script 56 necessary to accomplish the same task done using the object-oriented approach employed by object model system 10 (FIG. 4B). The API used in this example is that of an OLAP database called iTM1, which is distributed by Applix, Inc. of Westboro, Mass.

As illustrated in the examples, there is much more scripting needed to get a cube name from an API (7 lines) than from object model system 10 (1 line). Indeed, object-oriented programming is not only concise, it is far more intuitive from a developer's standpoint.

Object model system 10 employs another unique concept, referred to as adaptive instantiation and inflation. Adaptive inflation and instantiation deals with two major issues facing object-oriented application developers: (1) should all the collections of objects in an object model be fully instantiated (constructed in memory) when the object model is first accessed, or should instantiation occur only when requesting an object of a collection; and (2) should a requested object be inflated (populated with its attribute information) when the user requests the object, or should inflation occur only when requesting an object property or method. Both of these questions are generally answered in different ways for different applications. Instantiation and inflation up-front, though providing much faster long-term response in an application, can come at a great cost in performance overhead in applications with large volumes of data and many users. In contrast, instantiation and inflation on-demand, often referred to as just-in-time instantiation, could be slowed down by the fact that a request of each object requires that the object be instantiated and inflated on demand.

In terms of the multidimensional object model presented earlier, instantiating the full set of an OLAP database's Cube, Dimension, CubeView, Subset and other objects would come at a great cost of processor and memory overhead. In a web application, this scenario would quickly exhaust a web server's or other middle-tier server's resources.

The reason it is inefficient in a web environment to instantiate and inflate many objects relates to the earlier discussion about state: objects instantiated in a web environment live only as long as it takes to return a page to a user. Constantly re-instantiating and re-inflating many objects every time a user requests a web page at the very least slows down page retrieval. Worse, when object instantiation and inflation is happening on the web server, those objects also consume the same server resources needed to efficiently process web page requests.

Conversely, there may be times when a user of the application is continually addressing a particular object or set of objects, for example, when one desires to automatically instantiate and inflate portions of those objects in anticipation of requests.

Rather than choose a single instantiation and inflation architecture, object model system 18 is capable of adapting to the needs of the ASP web application developer. By default, object model software 18 will instantiate and inflate objects on demand. However, it is possible to instantiate and even inflate certain objects before they are requested. Developers can identify individual object properties, entire objects and even collections as needing to be instantiated and inflated when the object model 28 is first accessed.

Thus, as illustrated in FIG. 5, object model software 18 receives an indication at 58 that the object model 28 is being first accessed. At this point, object model software 18 instantiates and inflates objects which have been previously specified for up-front instantiation and inflation at 60. At 62, object model software 18 receives indications that objects are being accessed. Next, at 64, object model software 18 instantiates and inflates on demand any objects which were not already instantiated and inflated up-front. It should be understood that if all objects being accessed at 62 have already been instantiated and inflated up-front at 60, no on-demand instantiation and inflation is necessary at 64.

The following sample OLAP database for a fictitious company called WidgetCo demonstrates the concept behind adaptive inflation.

TABLE 1

Sample Database Structure

WidgetCo Corporate OLAP Database: Structure

| | |
|---|---|
| Cubes | 20 |
| Dimensions per cube | 6 |

TABLE 1-continued

Sample Database Structure

WidgetCo Corporate OLAP Database: Structure

| | |
|---|---|
| Subsets per dimension | 10 |
| CubeViews per cube | 10 |

Expanding the number of components in the database into a total number of objects yields the results shown in Table 2.

TABLE 2

Sample Database Total Objects

WidgetCo Corporate OLAP Database: Total Objects

| | |
|---|---|
| Cube Objects | 20 |
| Dimension Objects | (20 Cubes × 6 Dimensions) = 120 |
| Subset Objects | (120 Dimensions × 10 Subsets) = 1200 |
| CubeView Objects | (20 Cubes × 10 CubeViews) = 200 |
| Total Objects | (20 + 120 + 1200 + 200) = 1540 |

Even assuming that the WidgetCo OLAP Database shares a number of dimensions between cubes and reduce the number of dimensions, which many OLAP databases support, there are still a significant number of objects in this sample database.

Assuming, for the sake of working with whole numbers, that each object takes second to instantiate and inflate. Fully instantiating and inflating the WidgetCo sample OLAP Database would take 1540 seconds=25.67 minutes. While the actual time to instantiate and inflate an object is typically much less than a second, the fact remains that a measurable amount of processing time in the full instantiation and inflation scenario is spent building up the full object model.

In a typical web application using data from an OLAP database, a user is really requesting only a single CubeView from a single Cube and a single Subset for each Dimension in the Cube. The number of objects being used in this example is: 1 Cube+6 Dimensions+6 Subsets+1 CubeView=14 Objects.

Instantiating and inflating objects such as these as they are requested individually takes slightly longer than instantiating and inflating the objects all at once when the object model is first accessed. Assume in the WidgetCo application that instantiation and inflation of each object, keeping with whole numbers, takes 2 seconds when instantiating and inflating on demand. If only the 14 objects that a typical user requests were inflated as the objects were requested, the time to complete is only 28 seconds.

Figure 6:
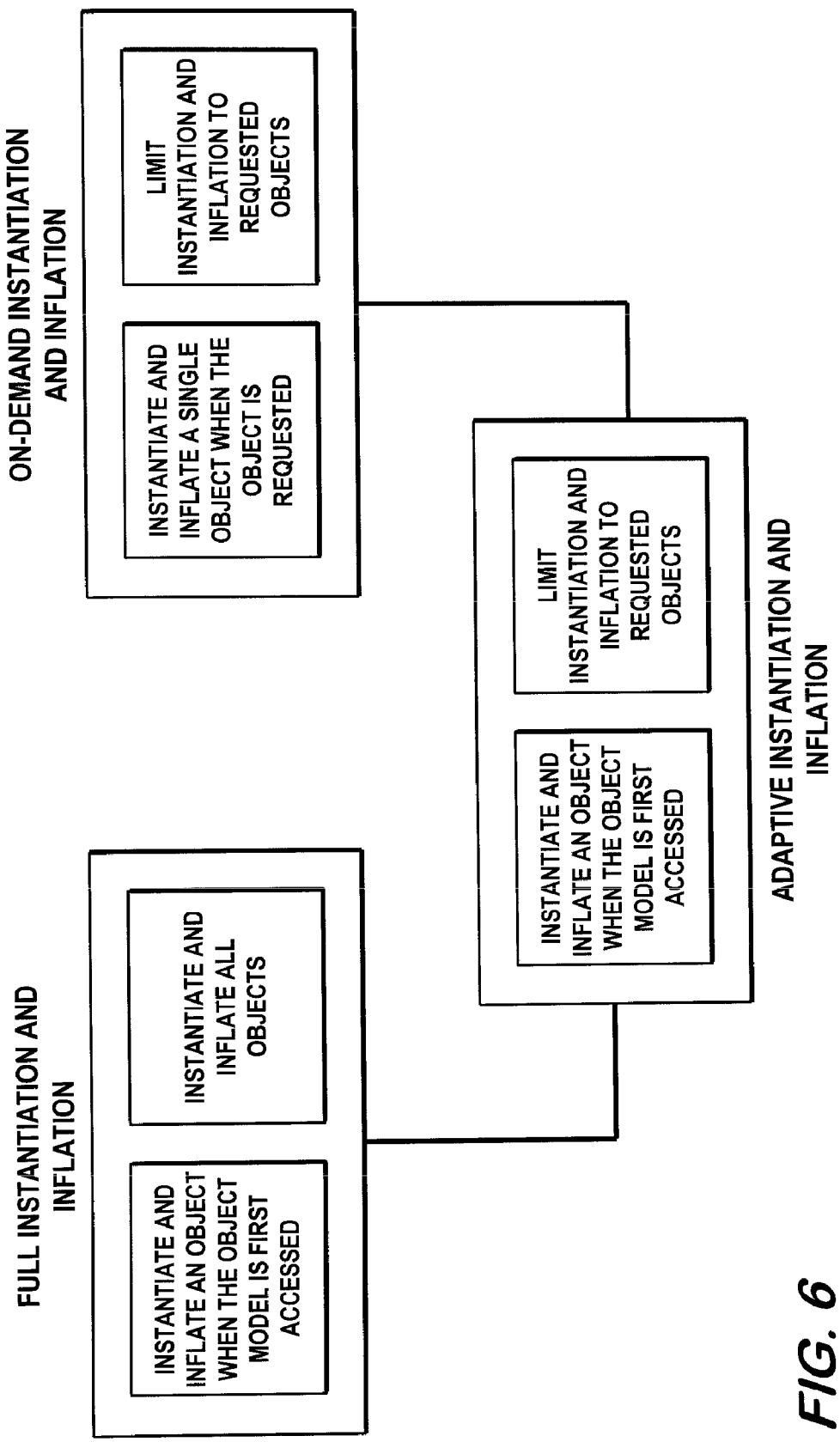
FIG. 6 is a schematic view illustrating the benefits of adaptive instantiation and inflation employed by the object model system of FIG. 1.

Adaptive instantiation and inflation combines the advantages of both of the approaches demonstrated in the above sample OLAP database application. FIG. 6 illustrates this best-of-both-worlds approach. Adaptive instantiation and inflation utilizes part of the approach of full object model instantiation and inflation in that instantiation and inflation is done when the object model is accessed, providing greater speed through pre-processing. Adaptive instantiation and inflation utilizes part of the approach of on-demand object model instantiation and inflation in that instantiation and inflation only occurs for objects that will be accessed, reducing the overhead of instantiating and inflating objects that are never used.

To take advantage of adaptive instantiation and inflation, the ASP developer can specify objects, collections of objects and even specific properties that should be automatically instantiated and inflated each time object model 28 is accessed. In our example, an ASP developer could easily identify the cube and related objects and properties as needing to be instantiated and inflated before they are ever requested.

The ASP developer identifies objects and properties via the entry point 30 in object model 28, the Dataspace object 32. The Dataspace object 32 contains methods that facilitate the identification of objects and properties that should be instantiated and inflated immediately. In particular, the ASP developer passes to object model software 18 an indication 66 (see FIG. 1) of necessary objects in the form of a structured string variable. This string variable can contain just the raw text of various objects separated by a delimiter, or could use strings in an extensible markup language (XML) format.

The features of adaptive instantiation and inflation, exposed through the Dataspace object 32, are similar to those methods exposed for the purpose of maintaining application state.

In the WidgetCo example, suppose a user request changed an existing view to look at a different department (e.g., sales) for a different period of time (e.g., May 2000). After the resulting web page was generated using ASP and object model software 18, any record of what that user asked to examine is gone. Thus, when the user comes back and attempts to pass through some updates to data in a view, it is important to be able to easily recognize exactly what the user was examining (e.g., sales and May 2000).

The Dataspace object 32 exposes methods that permit an ASP developer to pass in state information 68 (i.e., the fact that the user was last looking at the department "sales" and the time period "May 2000") to effectively re-establish where the user left off after the last request. This approach reduces the need for the system computer 12 (i.e., the web server) to waste resources preserving information about state in its own system variables. Instead, state information 68 can be stored on user computer 26, and passed to object model software 18 as needed. (see FIG. 1).

One of the other things the object model system 10 does is to expose the functionality and power inherent in OLAP API's to ASP developers of different levels of expertise and experience. A proficient ASP developer will have no problem using the system's 10 lower-level properties and methods to generate very dynamic web content built from a finer level of detail (i.e., one value at a time). A novice user, however, may not be ready to deal with vast amounts of script or even hypertext markup language (HTML).

System 10 has implemented innovative functionality via a number of object methods that can automatically generate HTML content based on a CubeView, Subset or other data object in an OLAP database. So, rather than have to extract data and place it into appropriate HTML or script placeholders, a novice developer can make a simple call to object model software 18 and directly receive well-structured HTML or script. The developer can even assign Class IDs for various HTML objects to support the use of web standards like style sheets, commonly used by web developers to ease the time required to consistently format the pages on a web site.

The present invention, therefore, provides an object model system for multidimensional applications which is comprehensive and intuitively structured, which is minimally inflatable and is expanded in memory only to the extent that a developer or user requests, which is capable of preserving application state without wasting large amounts of the web server's resources, and which provides shortcut methods to directly generate web content.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for displaying data instantiating and inflating objects from a multidimensional database to a user, said system comprising:
    a system computer having a processor and a memory;
    a multidimensional database accessible by said computer, said multidimensional database having objects stored thereon; and
    object model software executing on said system computer which accesses said multidimensional database, to instantiate and inflate a predefined group of specified objects stored on said database up-front a first time said multidimensional database is accessed, and instantiate and inflate nonspecified objects which are not included in the predefined group of specified objects stored on said database on demand as each of the nonspecified objects is accessed.

2. The system of claim 1 further comprising receiving from a user an indication of specified objects.

3. The system of claim 1 further comprising receiving from a user state information.

4. The system of claim 1 wherein the specified objects comprise collections of objects.

5. The system of claim 1 wherein the specified objects comprise specific properties of objects.

6. The system of claim 1 wherein said multidimensional database comprises a database having multidimensional financial data stored thereon.

7. The system of claim 1 wherein said multidimensional database comprises an OLAP database.

8. The system of claim 1 wherein said object model software employs an object model comprising:
    a dataspace comprising at least one dataserver;
    at least one cube object stored on each of said at least one dataserver, each of said at least one cube object comprising at least one saved view of data; and
    at least one dimension object stored on each of said at least one dataserver, each of said at least one dimension object comprising at least one saved subset of elements.

9. The system of claim 8 wherein the specified objects are identified via said dataspace.

10. The system of claim 1 further comprising receiving from a user an indication of specified objects.

11. The system of claim 10 wherein the indication of specified objects comprises a structured string variable.

12. The system of claim 11 wherein the structured string variable comprises raw text separated by delimiters.

13. The system of claim 11 wherein the structured string variable comprises strings in an extensible markup language (XML) format.

14. A system for instantiating and inflating objects from a multidimensional OLAP database, said system to a user, said system comprising:
    a system computer, having a processor and a memory;
    a multidimensional database accessible by said computer, said multidimensional database having objects stored thereon; and
    object model software executing on said system computer for accessing which accesses said multidimensional database to instantiate and inflate a predefined group of specified objects stored on said multidimensional database up-front a first time said multidimensional database is accessed, and to instantiate and inflate nonspecified objects which are not included in the predefined group of specified objects stored on said database on demand as each of the nonspecified objects is accessed, wherein said object model software receives from the user an indication of specified objects and state information.

15. The system of claim 14 wherein the specified objects comprise collections of objects.

16. The system of claim 14 wherein the specified objects comprise specific properties of objects.

17. A system for displaying data instantiating and inflating objects from a multidimensional database to a user, said system comprising: a system computer; a multidimensional database accessible by said computer, said multidimensional database having objects stored thereon; and object model software executing on said system computer which accesses said multidimensional database to instantiate and inflate a predefined group of specified objects stored on said multidimensional database up-front a first time said multidimensional database is accessed and to instantiate and inflate nonspecified objects which are not included in the predefined group of specified objects stored on said multidimensional database on demand as each of the nonspecified objects is accessed, wherein said object model software employs an object model comprising: a dataspace comprising at least one dataserver; at least one cube object stored on each of said at least one dataserver, each of said at least one cube object comprising at least one saved view of data; and at least one dimension object stored on each of said at least one dataserver, each of said at least one dimension object comprising at least one saved subset of elements.

18. The system of claim 17 wherein said multidimensional database comprises a database having multidimensional financial data stored thereon.

19. The system of claim 17 wherein said multidimensional database comprises an OLAP database.

20. The system of claim 17 wherein said at least one dataserver comprises a plurality of dataservers.

21. The system of claim 17 wherein each of said at least one dimension object further comprises at least one saved element.

22. The system of claim 17 wherein each of said at least one dimension object further comprises at least one saved hierarchy.

23. The system of claim 17 wherein the at least one saved view of data comprises at least one saved value of data.

24. The system of claim 17 wherein the at least one saved view of data comprises at least one saved subset of data.

25. The system of claim 17 wherein said dataspace comprises an entry point into said object model.

26. The system of claim 17 further comprising receiving from the user state information.

27. The system of claim 17 wherein the specified objects comprise collections of objects.

28. The system of claim 17 wherein the specified objects comprise specific properties of objects.

29. The system of claim 17 wherein the specified objects are identified via said dataspace.

30. The system of claim 29 further comprising receiving from the user an indication of specified objects.

31. The system of claim 30 wherein the indication of specified objects comprises a structured string variable.

32. The system of claim 31 wherein the structured string variable comprises raw text separated by delimiters.

33. The system of claim 31 wherein the structured string variable comprises strings in an extensible markup language (XML) format.

\* \* \* \* \*